(No Model.)

L. BEVERSDORF, Jr.
ANIMAL TRAP.

No. 385,788. Patented July 10, 1888.

Witnesses:
Geo. G. Thorpe
Theodore S. West

Inventor,
Louis Beversdorf Jr.
By his Attorneys.

UNITED STATES PATENT OFFICE.

LOUIS BEVERSDORF, JR., OF LULING, TEXAS.

ANIMAL-TRAP.

SPECIFICATION forming part of Letters Patent No. 385,788, dated July 10, 1888.

Application filed May 18, 1888. Serial No. 274,300. (No model.)

*To all whom it may concern:*

Be it known that I, LOUIS BEVERSDORF, Jr., a citizen of the United States, residing at Luling, in the county of Caldwell and State of Texas, have invented a new and useful Improvement in Animal-Traps, of which the following is a specification.

The invention relates to improvements in animal-traps, and is especially adapted to catch gophers or other animals that burrow in the ground.

It consists in the construction and novel combination of parts hereinafter described, illustrated in the accompanying drawings, and pointed out in the appended claims.

Figure 1:
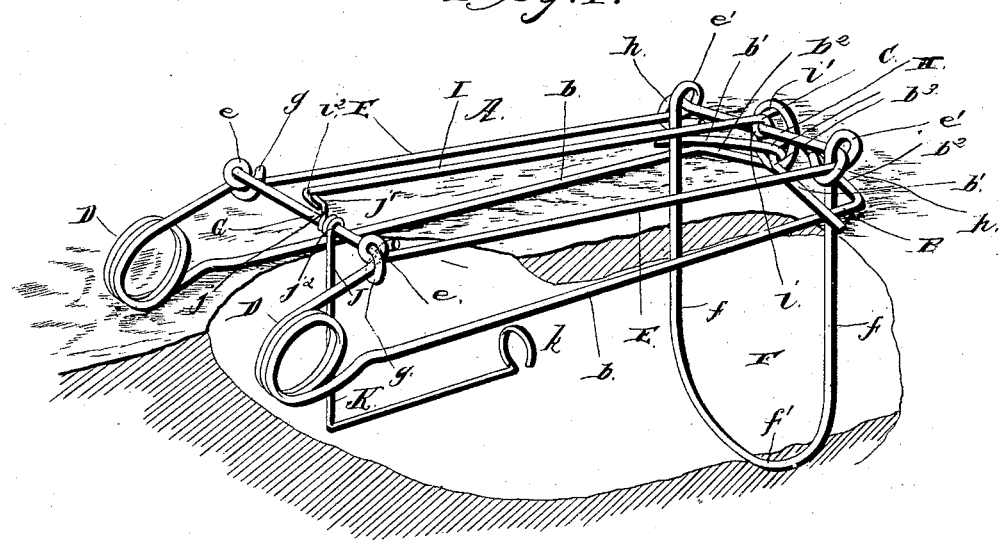
Figure 2:
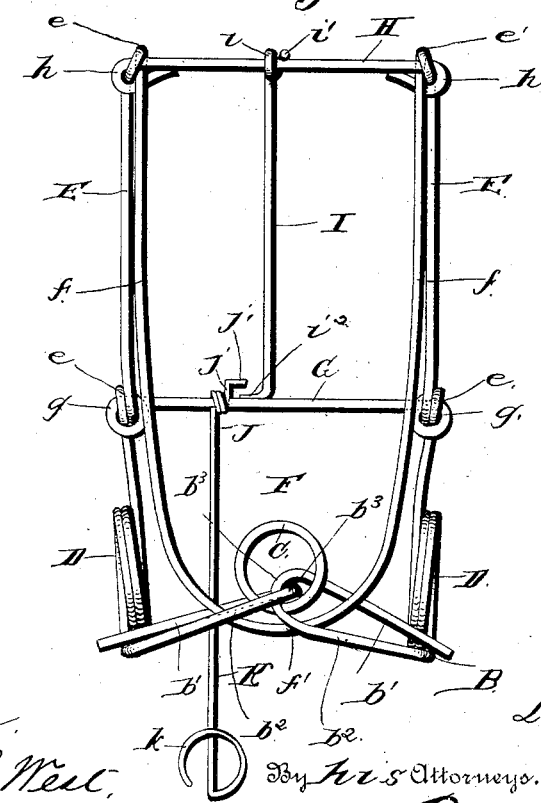

Figure 1 of the drawings is a perspective view of a trap embodying the invention, which trap is set adjoining the burrow of an animal, the earth being shown sectioned vertically through said burrow. Fig. 2 is a front elevation of the trap after it has been sprung.

All parts of the trap are preferably composed of steel wire, and their construction is as follows:

A designates the frame of the trap, composed of the single wire B, having the parallel base-arms $b$ $b$, bent inwardly at their outer portions, having their inwardly-standing arms $b'$, each bent reflexly on itself, so as to form the outwardly-standing end portion, $b^2$, and having their bends $b^3$ hooked upon each other.

C is a loop or ring of wire, which surrounds said bent portions and is loose thereon.

At the rear ends of the base-arms $b$ the wire B is bent in coils, to form the spring D integral with said wire, which extends upward and forward from said springs, forming the parallel arms E, provided with the upwardly-bent bearing-loops $e$ just in front of the springs D, and the upwardly-bent bearing-loops $e'$ at the ends of said arms E. Depending from the arms E, and at right angles thereto, the wire B forms the long loops F, having parallel side arms, $f$, and a rounded lower end, $f'$, the convexity of which is downward.

G is a transverse wire having hooked ends $g$, that engage in the opposite bearing-loops, $e$, and H is a similar wire having hooked ends $h$, that engage in the bearing-loops $e'$. The said wires are preferably of equal length, and keep the arms E at proper distances apart while bracing one upon the other.

I is the trigger-wire, having a loop, $i$, that surrounds and swings on the transverse wire H, and projecting frontward from the said loop the point $i'$ adapted to engage in the ring C. The rear end, $i^2$, of said wire is bent at right angles thereto and engages the transversely-bent end $j'$ of the frontwardly-extending point $j$ of the wire J, that is provided with a loop, $j^2$, surrounding and swinging on the transverse wire G, and with an arm, K, depending from said loop, which arm is bent at right angles and has a vertical loop, $k$, on its end, the loop standing about centrally in the hole and in the way of the animal.

To catch gophers or other burrowing animals, the long loop F is pushed down in the burrow of the said animal past the horizontal entrance therein and the point $i'$ is engaged in the ring C. When the animal attempts to escape upward, it disengages said point $i'$ and the loop F springs upward, catching the animal around the body between said loop and the wire H.

The trap can be used to catch rats, and does not need to be baited, as the animal releases the trigger in the act of escaping.

Having described my invention I claim—

1. In an animal-trap, the combination of the wire frame having the parallel base-arms $b$, the coiled springs D, the upwardly-extending arms E, and the downwardly-extending loop F, the loop or ring C on the bend and engaged portions $b^3$ of said wire, and the trigger-wire I, having the frontwardly-projecting point $i'$, engaging said ring, substantially as specified.

2. In an animal-trap, the combination of the frame A, of a single wire, having the parallel base-arms $b$, with their inwardly-standing arms $b'$, bent at $b^3$ upon themselves, to form the outwardly-standing end portions, $b^2$, the coiled-spring portions D, the arms E, provided with the bearing-loops $e$ $e'$, and the long downwardly-standing loop F, the transverse wires G and H, having the hooked ends $g$ and $h$, that respectively engage the bearing-loops $e$ and $e'$, the rings C on the bends of wire $b^3$, and the trigger-wire I, provided with the loop $i$, surrounding the wire G, and having the frontwardly-standing point $i'$, that engages the ring C, substantially as specified.

3. The combination of the wire frame A, having the base-arms $b$, the coiled-spring portions D, the upper arms, E, and the downwardly-extending loop F, the ring C, seated on the bends $b^3$ of said wire, the transverse wires G and H, connecting the arms F, the trigger-wire I, looped on the wire G, and having a point, $i'$, to engage the ring C, and a rear end, $i^2$, bent transversely, and the wire J, looped on the wire H and provided with a transversely-bent front end to engage the rear end, $i^2$, of the trigger-wire, and having a circular foot, $k$, at the end of its downwardly-bent rear arm, K, substantially as specified.

In testimony that I claim the foregoing as my own I have hereto affixed my signature in presence of two witnesses.

LOUIS BEVERSDORF, Jr.

Witnesses:
AUGUST BEVERSDORF,
SAML. J. DAVIDSON.